(12) United States Patent
Loentgen et al.

(10) Patent No.: US 11,293,566 B2
(45) Date of Patent: Apr. 5, 2022

(54) SUBSEA BUOYANCY SYSTEMS

(71) Applicant: Acergy France SAS, Suresnes (FR)

(72) Inventors: Vincent Loentgen, Chambry (FR); Blaise Seguin, Paris (FR); Marcel M. Landwehr, Magnolia, TX (US)

(73) Assignee: Acergy France SAS, Suresnes (FR)

( * ) Notice: Subject to any disclaimer, the term of this patent is extended or adjusted under 35 U.S.C. 154(b) by 126 days.

(21) Appl. No.: 16/303,123

(22) PCT Filed: May 18, 2017

(86) PCT No.: PCT/IB2017/000771
§ 371 (c)(1),
(2) Date: Nov. 19, 2018

(87) PCT Pub. No.: WO2017/199100
PCT Pub. Date: Nov. 23, 2017

(65) Prior Publication Data
US 2020/0318758 A1    Oct. 8, 2020

(30) Foreign Application Priority Data

| May 20, 2016 | (GB) | 1608930 |
| Jun. 10, 2016 | (GB) | 1610161 |
| Dec. 29, 2016 | (GB) | 1622372 |
| Mar. 15, 2017 | (GB) | 1704134 |

(51) Int. Cl.
*F16L 1/16* (2006.01)
*F16L 1/24* (2006.01)

(52) U.S. Cl.
CPC ............. *F16L 1/163* (2013.01); *F16L 1/24* (2013.01)

(58) Field of Classification Search
CPC ..................................... F16L 1/163; F16L 1/24
See application file for complete search history.

(56) References Cited

U.S. PATENT DOCUMENTS

| 3,605,670 | A | | 9/1971 | Dzikowski | |
| 3,855,803 | A | | 12/1974 | Lacroix | |
| 4,974,995 | A | | 12/1990 | Ayers | |
| 5,013,457 | A | * | 5/1991 | Mims | B01D 29/114 210/741 |
| 6,004,074 | A | * | 12/1999 | Shanks, II | E21B 17/012 405/195.1 |

FOREIGN PATENT DOCUMENTS

| FR | 2 572 986 | 5/1986 |
| GB | 2 167 017 | 5/1986 |
| GB | 2545959 | 7/2017 |
| JP | 4983003 | 7/2012 |
| WO | WO 2005/025830 | 3/2005 |

* cited by examiner

*Primary Examiner* — Janine M Kreck
(74) *Attorney, Agent, or Firm* — Levy & Grandinetti

(57) ABSTRACT

A method of providing buoyancy to a subsea structure such as a pipeline bundle includes attaching to the structure a rigid elongate buoyancy tube that defines a floodable envelope. The envelope is arranged to contain a mass of buoyant macrospheres. Multiple openings penetrate a tubular wall of the buoyancy tube, in fluid communication with a void that extends between the macrospheres inside the tube. The void floods via the openings when the buoyancy tube is submerged, whereupon the macrospheres apply buoyant upthrust to the surrounding buoyancy tube and hence to the subsea structure to which the tube is rigidly attached.

26 Claims, 5 Drawing Sheets

SUBSEA BUOYANCY SYSTEMS

This invention relates to the provision of buoyancy in subsea applications.

The art of subsea engineering requires buoyant elements that will resist being crushed under hydrostatic pressure in use. For example, buoyant elements may be attached to or incorporated into a structure or apparatus used in the subsea oil and gas industry, such as a flowline, a riser, a pipeline bundle or an ROV.

In some subsea applications, buoyancy must be provided to a structure or apparatus only temporarily, for example as an aid for towing and installation. The buoyancy must then be removed or reduced so that the structure or apparatus can settle stably on the seabed.

A conventional way of removing or reducing buoyancy is to remove a buoyant element, for example by uncoupling a buoy or by cutting straps that attach such an element to a subsea structure or apparatus.

Another conventional way of reducing the buoyancy of a subsea structure or apparatus is to add ballast. This may be achieved either by adding weighting equipment such as chains or clump weights to the structure or apparatus or by flooding a buoyancy tank of the structure or apparatus with a relatively dense fluid, most conveniently seawater. However, such operations can be challenging or impractical to perform, especially in deep water and on large structures.

It is known to use a gas-filled steel pipe as a buoyancy tank in shallow-water applications involving depths of up to about 200 m. Such a pipe may be used as a carrier pipe in a pipeline bundle that integrates heating, power and control systems with various flowlines for production fluids or for the injection of water, gas or chemicals. The bundle is assembled and tested onshore and is then launched and transported to its offshore location, for example using the controlled depth tow method (CDTM) that involves suspending the bundle between two tow vessels. On arrival at the installation site, once the bundle has been manoeuvred into the desired orientation, the carrier pipe is flooded to lower the bundle to the seabed and to stabilise the bundle in its final location.

The risk of crushing under hydrostatic pressure precludes the use of gas-filled buoyancy tanks in deep-water operations, which may involve depths of up to 3000 m. In principle, large buoyant elements containing gas would need such thick walls for deep-water use that their cost would be prohibitive and their buoyant uplift would be offset substantially by their weight.

As a result of these challenges, it is well known to provide buoyancy in deep water using a granular mass of buoyant spheres or beads. Buoyant spheres typically have a rigid spherical wall or shell of glass, ceramics, metal, polymer or composites surrounding a lightweight core or a hollow interior that contains a gas such as air or nitrogen.

Buoyant spheres may, for example, be used in syntactic foams having a binary composite structure that comprises hollow rigid microspheres, micro-balloons or beads embedded in a rigid matrix. Such microspheres typically have an outer diameter of substantially less than 1 mm, say 10 μm to 200 μm. They have a specific gravity that is low enough and a volume fraction that is high enough, in bulk, to confer substantial positive buoyancy on a body of syntactic foam into which they are incorporated. By way of example, buoyant spheres of glass are sold in bulk by 3M™ as 'Glass Bubbles', in various grades.

It is also known for syntactic foams to contain macrospheres that have a typical outer diameter in a range from about 5 mm to about 50 mm or more, but usually greater than 10 mm. Macrospheres typically comprise a rigid shell of epoxy resin that may include reinforcing elements such as chopped glass fibres or carbon fibres. This enables them to sustain the hydrostatic pressure of deep water up to say 3000 m, equating to a pressure of approximately 300 bar in seawater. The shell may be supported on a solid or hollow lightweight core as exemplified by the teaching of FR 2572986. Some syntactic foams comprise a mixture of microspheres and macrospheres.

The exemplary dimensions of microspheres and macrospheres set out above are given for ease of understanding and are not intended to be limiting. Nor is it essential that buoyant spheres or beads must be perfectly spherical. However, substantial sphericity is an advantage to maximise resistance to crushing, to minimise material usage and to simplify packing.

Syntactic foam is just one example of the use of a granular mass of buoyant spheres. For example, buoyant spheres can be supported in a liquid—providing what is known in the art as 'liquid buoyancy'—or surrounded by a gas. Buoyant spheres can be held in a rigid buoyancy tank or in a flexible bag. More generally, it is possible for a buoyant element to contain macrospheres with substantially no matrix in the interstitial voids between them. Where there is no matrix, the macrospheres are held together as a granular bulk material in an envelope, such as a pipe or a bag, that can be fastened to, or built into, a subsea structure or apparatus.

The envelope preferably holds the macrospheres in a tightly-packed configuration to maximise the packing factor, expressed as a percentage of the internal volume that is occupied by macrospheres. For example, vibrating a mass of substantially identical macrospheres to settle them into relatively stable arrays within an envelope can achieve a packing factor in excess of 60%, even approaching 70%.

A rigid envelope containing macrospheres could be sealed like a buoyancy tank to retain a gas in the voids between the macrospheres. In that case, the macrospheres will support the envelope and will provide secondary buoyancy in the event that the envelope is ever flooded. However, if the macrospheres are packed closely in the envelope to minimise voids between them, the gas in the envelope cannot occupy more than 30% to 40% of the internal volume. Consequently, ballasting by flooding the fraction of the internal volume that was previously occupied by the gas may not add sufficient weight to stabilise a subsea structure or apparatus on the seabed.

A problem of sealing a rigid, gas-containing envelope is that, like a buoyancy tank, the walls of the envelope must be thick and rigid and hence too costly and heavy for deep-water applications. Preferably, therefore, the envelope has openings so as to admit seawater into its interior to flood the voids between the macrospheres. This means that the envelope does not need to resist hydrostatic pressure and so can be thin, light and inexpensive, and may be either rigid or flexible.

Where the interior of an envelope surrounding a mass of macrospheres is flooded, buoyant upthrust will arise from displacement of seawater corresponding to the aggregate external volume of the macrospheres within the envelope. Upthrust forces are transferred from the macrospheres to the surrounding envelope and from there to the subsea structure or apparatus to which the envelope is attached, or into which the envelope is incorporated.

As the unoccupied space within a flooded envelope containing a mass of macrospheres will be filled by seawater, the packing factor determines the aggregate buoyancy of a buoyant element comprising an envelope of a given size. A high packing factor enables a relatively small and inexpensive envelope to hold enough macrospheres to provide a desired degree of buoyancy.

As an example of this approach, JP 4983003 discloses a flexible hollow buoy containing macrospheres and makes limited provision for seawater to flow around the macrospheres inside the buoy. Specifically, the buoy in JP 4983003 has an inlet and an outlet opening respectively on the bottom and the top of the buoy. On sinking the buoy into the sea, water will flow through the buoy and around the macrospheres from the inlet opening to the outlet opening.

A discrete flexible buoy like that disclosed in JP 4983003 cannot practically be used to confer buoyancy upon a large elongate subsea element such as a pipeline bundle.

Against this background, the present invention provides a buoyant element, comprising a rigid elongate buoyancy tube defining a floodable envelope that holds a mass of buoyant macrospheres within. To flood the envelope, the buoyancy tube has at least one opening in fluid communication with a void that extends between and around the macrospheres inside the buoyancy tube.

Multiple openings suitably penetrate a tubular wall of the buoyancy tube, in fluid communication with the void that extends between the macrospheres inside the tube.

The macrospheres are suitably wider than the openings in the tubular wall of the buoyancy tube so as to be retained in the buoyancy tube. For example, the openings in the tubular wall of the buoyancy tube may be no larger than 10 mm in diameter. The macrospheres are optimally between 15 mm and 35 mm in diameter.

The buoyant element may further comprise connection structures such as frames or fixings such as straps for attaching the buoyancy tube to a subsea structure. Such structures or fixings may be spaced longitudinally along the buoyancy tube and suitably extend transversely or orthogonally with respect to a central longitudinal axis of the buoyancy tube.

The buoyancy tube is suitably of polymer or polymer composite material, may be foraminous along its length and/or may have one or more closed ends. One or more of the closed ends is suitably defined by a movable or removable closure affording access to the interior of the buoyancy tube for loading or removing the macrospheres.

The macrospheres may be contained within one or more floodable auxiliary containers within the buoyancy tube, for example a foraminous bag penetrated by holes that are smaller than the macrospheres contained within. Such auxiliary containers within the buoyancy tube may be linked in longitudinal series.

The inventive concept embraces a combination of a subsea structure and a buoyant element of the invention, attached to the subsea structure.

Where the subsea structure is elongate, such as a pipeline bundle, the buoyancy tube suitably extends along and substantially parallel to the subsea structure. For example, the buoyancy tube may be attached externally to a pipeline bundle or may be located within an external carrier pipe of a pipeline bundle. In either case, the buoyancy tube is conveniently secured to transversely-extending, longitudinally-spaced guide frames of the pipeline bundle.

The inventive concept extends to a method of providing buoyancy to a subsea structure, that method comprising attaching to the structure a rigid elongate buoyancy tube defining a floodable envelope for containing a mass of buoyant macrospheres.

The mass of macrospheres may be placed into the buoyancy tube before or after attaching the buoyancy tube to the structure. Conveniently, the mass of macrospheres may be placed into the buoyancy tube through at least one open end of the buoyancy tube, and then the or each open end may be closed. The mass of macrospheres may, for example, be placed into the buoyancy tube in discrete, individually contained portions.

The buoyancy tube containing the mass of buoyant macrospheres may then be immersed to flood a void that surrounds the macrospheres within the buoyancy tube.

When buoyancy is to be reduced, the buoyancy tube may subsequently be detached from the subsea structure. Alternatively, at least some of the mass of macrospheres may be removed from or destroyed in the buoyancy tube while the buoyancy tube remains attached to the subsea structure.

For example, macrospheres may be removed from the buoyancy tube while the macrospheres are contained in a bag or other auxiliary container. In this way, it is possible to remove one or more discrete portions of the mass of macrospheres from the buoyancy tube while leaving one or more other discrete portions of that mass in the buoyancy tube.

The invention provides a highly-efficient and cost-effective buoyancy solution. It facilitates a narrow and elongated buoyancy device, unlike solid buoys or tanks that are substantially spherical or parallelepiped in shape.

In summary, embodiments of the invention provide a buoyancy system for a subsea structure, the system comprising: at least one rigid buoyancy tube that has small-diameter lateral holes and that contains buoyant macrospheres whose diameter is greater than the diameter of the holes; and connection means to attach the buoyancy tube to the subsea structure.

Alternatively, when the macrospheres are contained within a permeable cover, the diameter of the lateral holes of the buoyancy tube does not need to be smaller than the macrospheres but only reasonably smaller than the cover. This is because the risk of spillage is limited by the cover, whereas the mesh/perforations of the cover actually need to be smaller than the spheres.

The invention also provides a method to float a subsea structure, that method comprising: connecting at least one rigid buoyancy tube to the subsea structure, that buoyancy tube having a plurality of small-diameter holes; filling the buoyancy tube with macrospheres whose diameter is greater than the diameter of the holes in the buoyancy tube; closing one or more ends of the tube; and floating the subsea structure in the sea. Conveniently, the buoyancy tube may be filled with macrospheres through an open end of the tube that is subsequently closed.

The buoyancy tube may, for example, be of HDPE, PE or PVC and may be fastened to an elongate subsea structure by one or more frames or other connecting structures or fixings.

The subsea structure is suitably a pipeline bundle. Connection of the buoyancy tube to the structure may be effected by strapping the buoyancy tube to the structure. Where the structure is a pipeline bundle, connection of the buoyancy tube to the structure may be effected by clamping or otherwise attaching the buoyancy tube to transverse guide frames of the bundle.

The macrospheres may lie loosely within the buoyancy tube, unconstrained other than by the tube itself, or may be contained within at least one permeable cover inside the tube, which cover may be flexible. Such a cover may be of fabric or may be a perforated or porous polymer bag, or may be a net whose mesh size is smaller than the diameter of the macrospheres. This allows the openings in the buoyancy tube to be larger than the spheres although not larger than the cover.

A multiplicity of holes are provided in the walls of the buoyancy tube to ensure reliable and prompt flooding and pressure equalisation. The holes may be smaller than 10 mm. The diameter of the macrospheres may be greater than 10 mm but preferably less than 50 mm. Optimally the macrospheres are between 15 mm and 35 mm in diameter.

Using buoyant spheres within a flooded envelope enables the benefits of pipeline bundles to be extended to deep-water applications. For example, a bundle may comprise a buoyant element in the form of a buoyancy tube or pipe that is filled with macrospheres. The various other pipes and cables of the bundle may be held relative to each other by transverse guide frames spaced along the buoyancy tube. Typically, stability requires the buoyancy tube to lie above the various flowlines in the bundle.

The macrospheres in the buoyancy tube provide the buoyancy required for towing the bundle from an assembly yard to an installation site. The buoyancy tube has holes to allow free water circulation to flood the voids around the macrospheres and so to preclude collapse of the pipe under hydrostatic pressure. Thus, the buoyancy tube may be of lightweight polymer or fibre-reinforced polymer composites.

When it is required to reduce buoyancy without adding separate ballast, the buoyant element can be released from the associated subsea structure while retaining the macrospheres within. This may, for example, allow the associated subsea structure to settle stably on the seabed. Alternatively the macrospheres can be imploded or destroyed within the envelope while the flooded envelope remains attached to the subsea structure, for example by initiating a cascading chain of implosive shockwaves that travel through the mass of macrospheres within the envelope. This is preferred to the environmental drawback of releasing the macrospheres from the envelope into the sea, as disclosed for example in U.S. Pat. No. 3,605,670.

The macrospheres used in the invention are preferably hollow and gas-filled but could contain a readily-compressible lightweight solid such as a foam, or a liquid or a vacuum.

Thus, the invention provides buoyancy to a subsea structure such as a pipeline bundle by attaching to the structure a rigid elongate buoyancy tube that defines a floodable envelope. The envelope is arranged to contain a mass of buoyant macrospheres.

Multiple openings penetrate a tubular wall of the buoyancy tube, in fluid communication with a void that extends between the macrospheres inside the tube. The void floods via the openings when the buoyancy tube is submerged, whereupon the macrospheres apply buoyant upthrust to the surrounding buoyancy tube and hence to the subsea structure to which the tube is rigidly attached.

In order that the invention may be more readily understood, reference will now be made, by way of example, to the accompanying drawings, in which.

Figure 2:
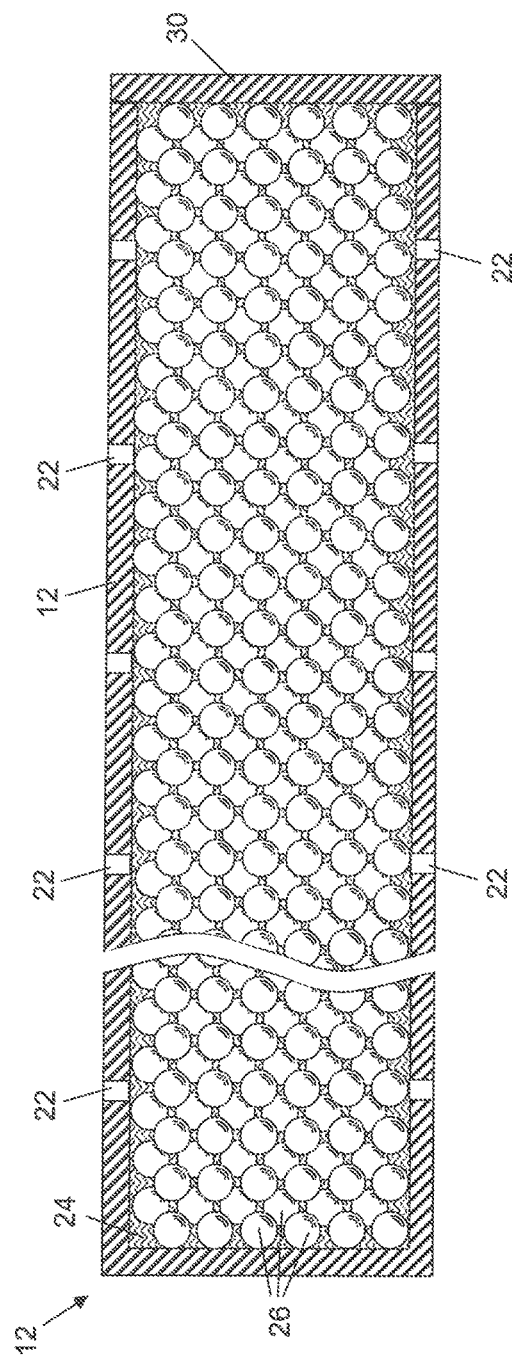
FIG. 2 is a schematic side view of a buoyancy tube like that shown in FIG. 1, filled with closely-packed but loose macrospheres.
Figure 3:
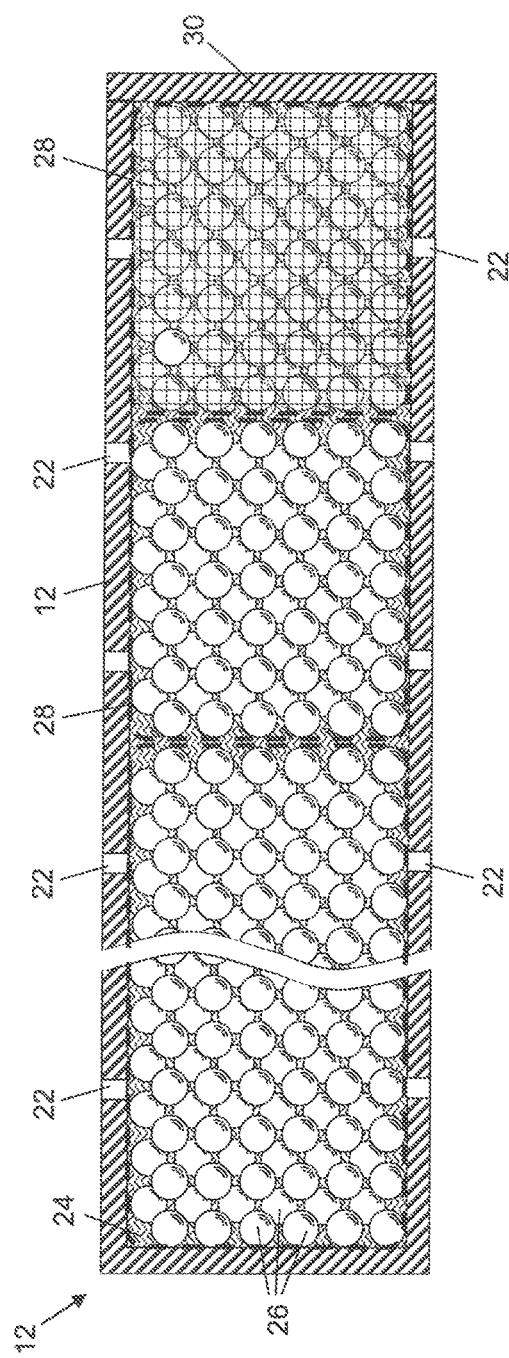
Figure 4:
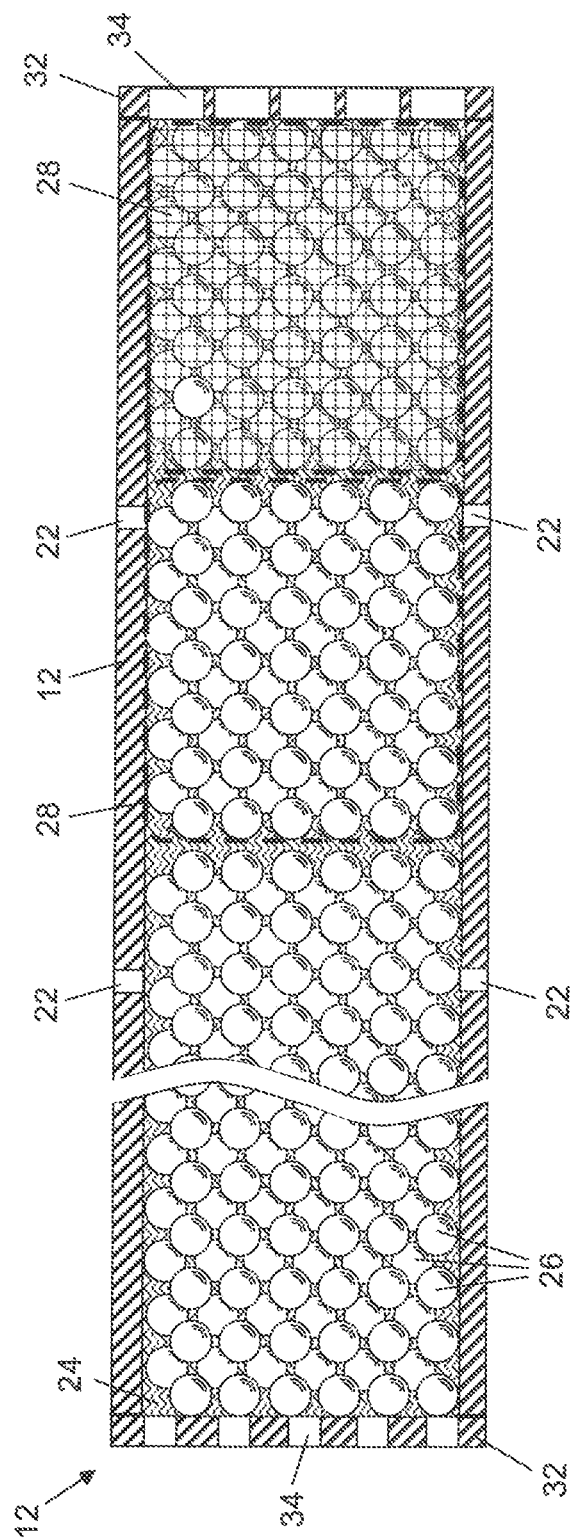
Figure 5:
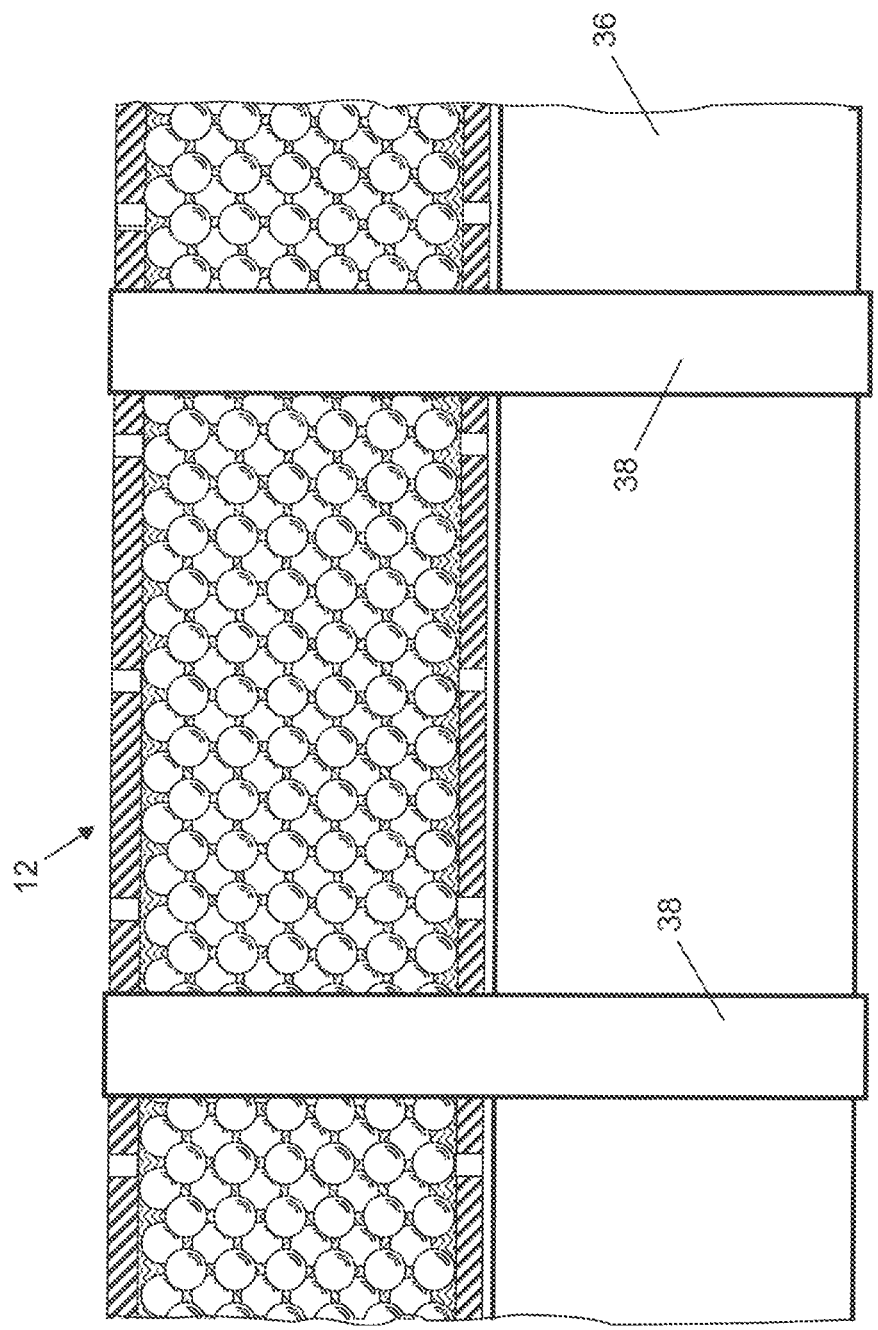
Figure 6:
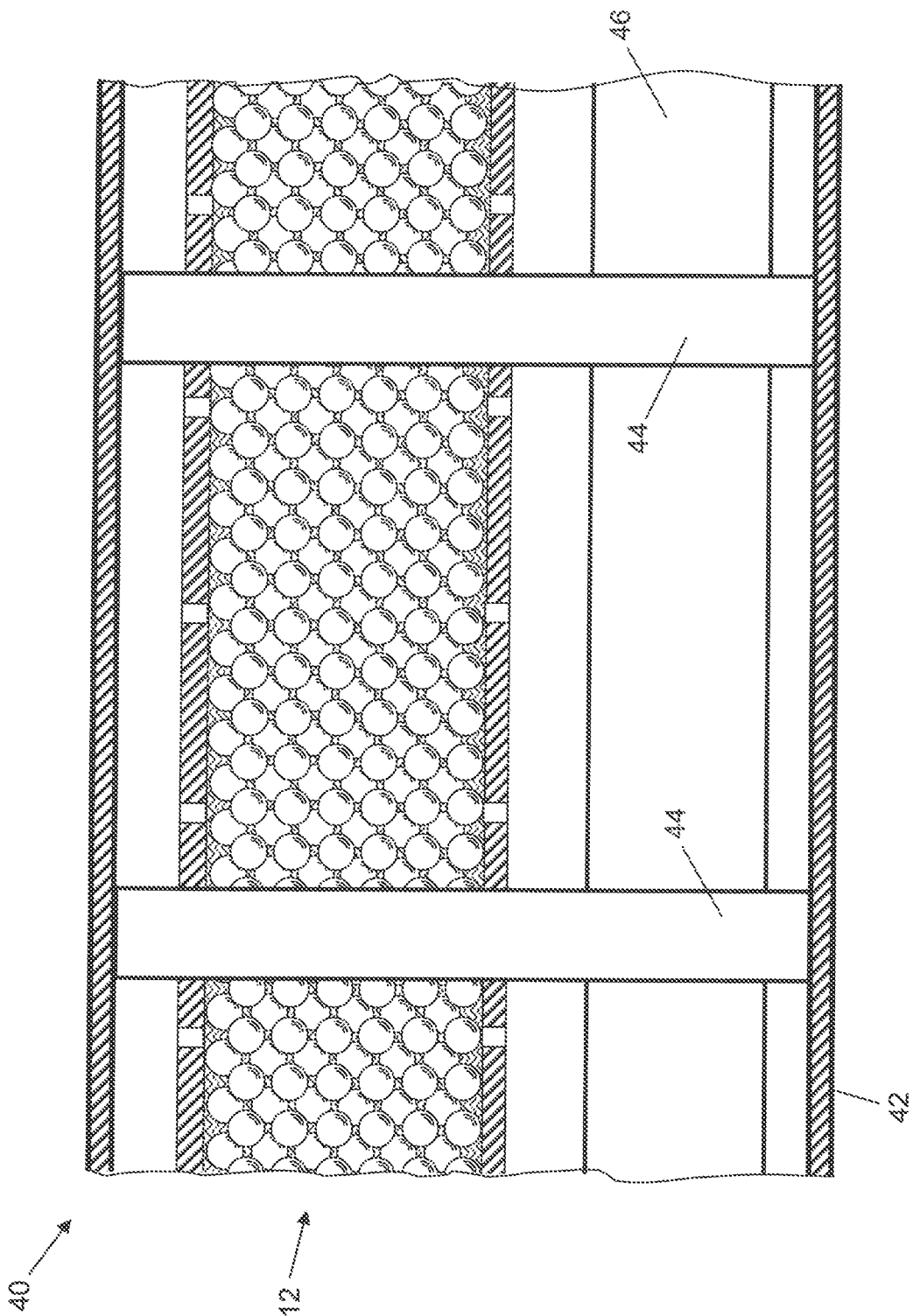

FIG. 3 corresponds to FIG. 2 but shows the closely-packed macrospheres contained within porous bags in the buoyancy tube;

FIG. 4 is a variant of the embodiments shown in FIGS. 2 and 3, in which ends of the buoyancy tube have openings through which the interior of the tube can be flooded;

FIG. 5 shows a buoyancy tube of the invention attached to the outside of a pipeline bundle; and FIG. 6 shows a buoyancy tube of the invention supported within a carrier pipe of a pipeline bundle.

Figure 1:
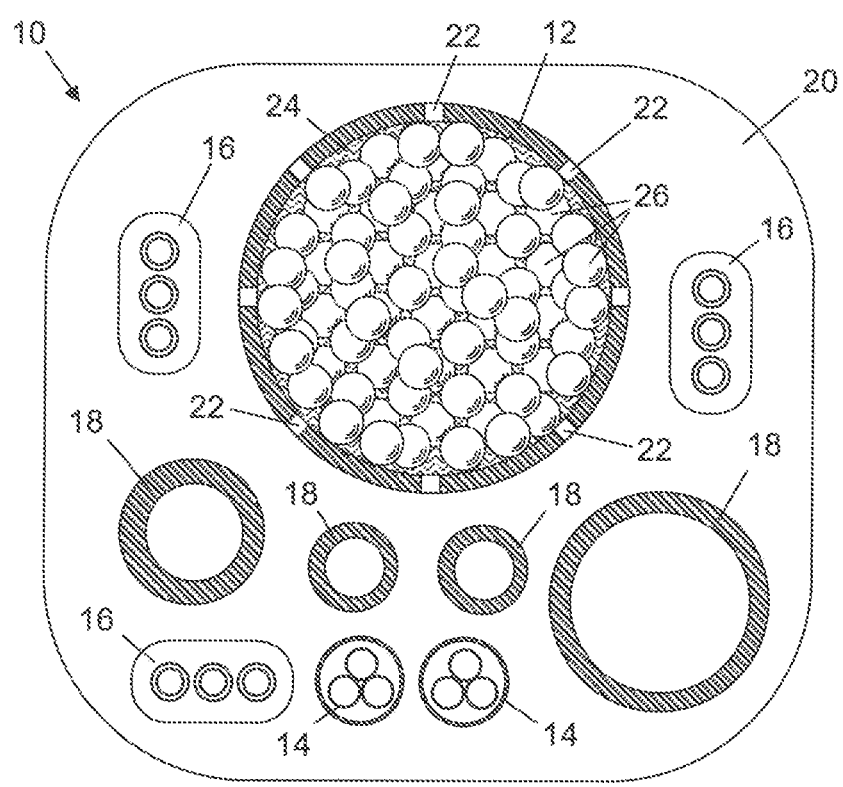
FIG. 1 is a schematic cross-sectional view of a pipeline bundle comprising a buoyancy tube of the invention filled with buoyant macrospheres and flooded with seawater in voids between the macrospheres.

Referring firstly to FIG. 1 of the drawings, which is much-simplified and not to scale, a pipeline bundle 10 for use in deep-water applications integrates heating, power and control systems. The bundle 10 comprises a buoyant element that, in this example, takes the form of a closed-ended buoyancy tube 12 positioned toward an upper side of the bundle 10. The bundle 10 further comprises power cables 14, data lines 16 and various flowlines 18 for production fluids and for the injection of water, gas or chemicals, all extending generally parallel to the buoyancy tube 12 and to each other.

One of several longitudinally-spaced transverse guide frames 20 is also shown in FIG. 1. The guide frames 20 hold the various elongate components of the bundle 10 relative to each other with appropriate mutual transverse spacing. In practice, the shape of the guide frames 20 will be more complex than is represented schematically here.

The buoyancy tube 12 has a substantially rigid tubular wall and is suitably of a polymer or of fibre-reinforced polymer composites. The use of such lightweight materials is enabled by holes 22 that penetrate the tubular wall of the buoyancy tube 12. The holes 22 allow seawater 24 to flood the interior of the buoyancy tube 12 to preclude its collapse under hydrostatic pressure. The holes 22 are shown here distributed angularly around the circumference of the buoyancy tube 12.

The buoyancy tube 12 is packed with a mass of gas-filled macrospheres 26 to provide the buoyancy required to tow the bundle 10 from an assembly yard to a deep-water installation site. Even when closely packed, the macrospheres 26 leave a void in the buoyancy tube 12 that extends between and around the macrospheres 26. The void communicates with the holes 22 to allow free circulation of seawater 24 into the buoyancy tube 12 and between and around the macrospheres 26. This ensures effective pressure equalisation between the interior and the exterior of the buoyancy tube 12.

FIG. 2 shows the buoyancy tube 12 filled with closely-packed but loose macrospheres 26. It will be apparent from FIG. 2 that the holes 22 are distributed longitudinally along the length of the buoyancy tube 12. It will also be apparent that the holes 22 are of smaller diameter than the macrospheres 26 so that the macrospheres 26 cannot spill out of the buoyancy tube 26 through the holes 22.

FIG. 3 corresponds to FIG. 2 but shows the closely-packed macrospheres 26 instead contained within bags 28 in the buoyancy tube 12. The bags 28 are porous, perforated or of mesh, with pores or other openings that are narrower than the diameter of the macrospheres 26 so as to retain the macrospheres 26 in the bags 28.

The bags 28 are conveniently shaped to fit closely into the interior of the buoyancy tube 12. By dividing the mass of macrospheres 26 into smaller and more easily handled portions, the bags 28 may help with the operation of packing the macrospheres 26 into the buoyancy tube 12. The bags 28 may be flexible or rigid envelopes or containers.

The use of bags 28 may also help to achieve greater packing density of the macrospheres 26. In this respect, it will be noted that such small envelopes as bags 28 may be more easily packed with macrospheres 26 than the long buoyancy tube 12. For example, it would be more practical to shake a bag 28 to improve the packing density of macrospheres 26 within than it would be to shake the entire buoyancy tube 12.

When the macrospheres 26 are packed in bags 28, the holes 22 that penetrate the tubular wall of the buoyancy tube 12 could, in principle, be slightly larger than the macrospheres 26. This is because the bags 28 will resist spillage of the macrospheres 26 from the buoyancy tube 12.

As the bags 28 will retain the macrospheres 26 packed within, it would be possible in principle to pull one or more of the bags 28 out of an open end of the buoyancy pipe 26 when it is desired to reduce buoyancy. If removed from the buoyancy tube 12 underwater, the bags 28 will float to the surface while preventing the macrospheres 26 from spilling into the sea. The bags 28 could be connected in longitudinal series, for example by a wire, so that a chain of multiple bags 28 can be removed conveniently from the buoyancy tube 12 in a single pulling action.

FIGS. 2 and 3 also show that one or both ends of the buoyancy tube 12 may be closed with a movable or removable closure 30 after macrospheres 26 have been poured or packed into the interior of the buoyancy tube 12 through a previously open end.

FIG. 4 is a variant of the embodiments shown in FIGS. 2 and 3, in which one or both ends of the buoyancy tube 12 have one or more openings through which the interior of the tube can be flooded upon immersion. In this example, both ends of the tube have perforated end covers 32 penetrated by an array of holes 34.

Flooding of the buoyancy tube 12 may be effected primarily through the holes 34 in the end covers 32. However, to aid flooding and purging of air without pressure waves damaging the macrospheres 26 within the tube 12, some holes 22 may optionally also be provided in the wall of the tube 12 as in the preceding embodiments. Nevertheless, as shown, fewer holes 22 may be necessary than in the preceding embodiments.

FIG. 4 illustrates two approaches to retain the macrospheres 26 within the buoyancy tube 12. In the end cover 32 on the left in FIG. 4, the holes 34 are relatively small in diameter, being smaller than the diameter of the macrospheres 26. The loose macrospheres 26 at this end of the buoyancy tube 12 are therefore contained by the end cover 32. Conversely, at the other end of the buoyancy tube 12 shown on the right in FIG. 4, the macrospheres 26 are contained in porous bags 28 whose pores or other openings are narrower than the diameter of the macrospheres 26. This retains the macrospheres 26 in the bags 28 and so allows the holes 34 in the end cover 32 on the right in FIG. 4 to be, optionally, larger than the diameter of the macrospheres 26.

Finally, FIGS. 5 and 6 show the buoyancy tube 12 of the invention applied to different pipeline bundles, along which the buoyancy tube 12 extends in parallel relation.

The pipeline bundle 36 represented schematically in FIG. 5 has no external carrier pipe. In this example, the buoyancy tube 12 is conveniently attached to the outside of the bundle 36 by longitudinally-spaced fixings 38. The fixings 38 are exemplified here by straps that extend around both the bundle 36 and the buoyancy tube 12. The straps are tensioned to pull together the bundle 36 and the buoyancy tube 12.

In contrast, the pipeline bundle 40 represented schematically in FIG. 6 is contained within an external carrier pipe 42. Here, the buoyancy tube 12 is conveniently secured inside the carrier pipe 42, in this example by being clamped or otherwise attached to longitudinally-spaced guide frames 44 that also support one or more pipelines 46 of the bundle 40.

In principle, it would be possible to secure the buoyancy tube 12 to the outside of the carrier pipe 42 of the bundle 40 in FIG. 6, in a similar manner to the arrangement shown in FIG. 5.

Other variations are possible within the inventive concept. At one extreme, it would be possible to rely entirely upon a bag to contain the macrospheres and so for the buoyancy tube to have wholly open ends without end covers. It would also be possible for the end covers to be nets or meshes with appropriate mesh sizes, depending upon whether or not the end covers are relied upon to retain the macrospheres within the buoyancy tube.

In principle, the buoyancy tube could itself be a rigid hollow elongate body of mesh with a mesh size appropriate to retain loose macrospheres within or to hold floodable bags that, in turn, retain the macrospheres.

The invention claimed is:

1. A buoyant element, comprising a rigid elongate buoyancy tube defining a floodable envelope that holds a mass of buoyant macrospheres within, the buoyancy tube having a void that extends between and around the mass of macrospheres inside the buoyancy tube and having multiple openings that penetrate a tubular wall of the buoyancy tube and are in fluid communication with the void, wherein each opening has a diameter that is smaller than the diameter of the macrospheres so as to retain the macrospheres in the buoyancy tube, and wherein the void is flooded with water.

2. The buoyant element of claim 1, wherein the macrospheres are wider than the or each opening of the buoyancy tube.

3. The buoyant element of claim 1, further comprising connection structures or fixings for attaching the buoyancy tube to a subsea structure.

4. The buoyant element of claim 1, wherein the buoyancy tube is of polymer or polymer composite material.

5. The buoyant element of claim 1, wherein the buoyancy tube is foraminous along its length.

6. The buoyant element of claim 1, wherein the buoyancy tube has one or more closed ends.

7. The buoyant element of claim 6, wherein one or more of the closed ends is defined by a movable or removable closure affording access to the interior of the buoyancy tube for loading or removing the macrospheres.

8. The buoyant element of claim 1, wherein the or each opening is no larger than 10 mm in diameter.

9. The buoyant element of claim 1, wherein the macrospheres are between 15 mm and 35 mm in diameter.

10. In combination, a subsea structure and a buoyant element as defined in claim 1, attached to the subsea structure.

11. The combination of claim 10, wherein the subsea structure is elongate and the buoyancy tube extends along and substantially parallel to the subsea structure.

12. The combination of claim 11, wherein the subsea structure is a pipeline bundle.

13. The combination of claim 12, wherein the buoyancy tube is attached externally to the pipeline bundle.

14. The combination of claim 12, wherein the buoyancy tube is located within an external carrier pipe of the pipeline bundle.

15. The combination of claim 12, wherein the buoyancy tube is secured to transversely extending, longitudinally spaced guide frames of the pipeline bundle.

16. A buoyant element, comprising a rigid elongate buoyancy tube defining a floodable envelope that holds a mass of buoyant macrospheres within and has at least one opening in fluid communication with a void that extends between the macrospheres, wherein the macrospheres are contained in the buoyancy tube within one or more floodable auxiliary containers, the or each floodable auxiliary container being a foraminous bag defining holes that are smaller than the macrospheres contained within.

17. The buoyant element of claim 16, wherein auxiliary containers within the buoyancy tube are linked in longitudinal series.

18. A method of providing buoyancy to a subsea structure, the method comprising:

attaching to the structure a rigid elongate buoyancy tube defining a floodable envelope containing a mass of buoyant macrospheres; and immersing the buoyancy tube containing the mass of buoyant macrospheres while flooding a void through multiple openings that penetrate a tubular wall of the buoyancy tube, which void extends between and surrounds the mass of macrospheres within the buoyancy tube.

19. The method of claim 18, comprising placing the mass of macrospheres into the buoyancy tube after attaching the buoyancy tube to the structure.

20. The method of claim 18, comprising placing the mass of macrospheres into the buoyancy tube through at least one open end of the buoyancy tube, and then closing the or each open end.

21. The method of claim 19, comprising placing the mass of macrospheres into the buoyancy tube in discrete, individually contained portions.

22. The method of claim 18, comprising subsequently detaching the buoyancy tube from the subsea structure.

23. The method of claim 18, comprising subsequently removing at least some of the mass of macrospheres from the buoyancy tube while the buoyancy tube remains attached to the subsea structure.

24. The method of claim 23, comprising removing macrospheres from the buoyancy tube while the macrospheres are contained in a bag or other auxiliary container.

25. The method of claim 23, comprising removing one or more discrete portions of the mass of macrospheres from the buoyancy tube while leaving one or more other discrete portions of that mass in the buoyancy tube.

26. The method of claim 18, comprising subsequently destroying at least some of the mass of macrospheres while the macrospheres are in the buoyancy tube and the buoyancy tube remains attached to the subsea structure.

\* \* \* \* \*